Dec. 19, 1950          A. F. FLOURNOY          2,534,257
                        SOLDERING IRON
                      Filed Jan. 23, 1947
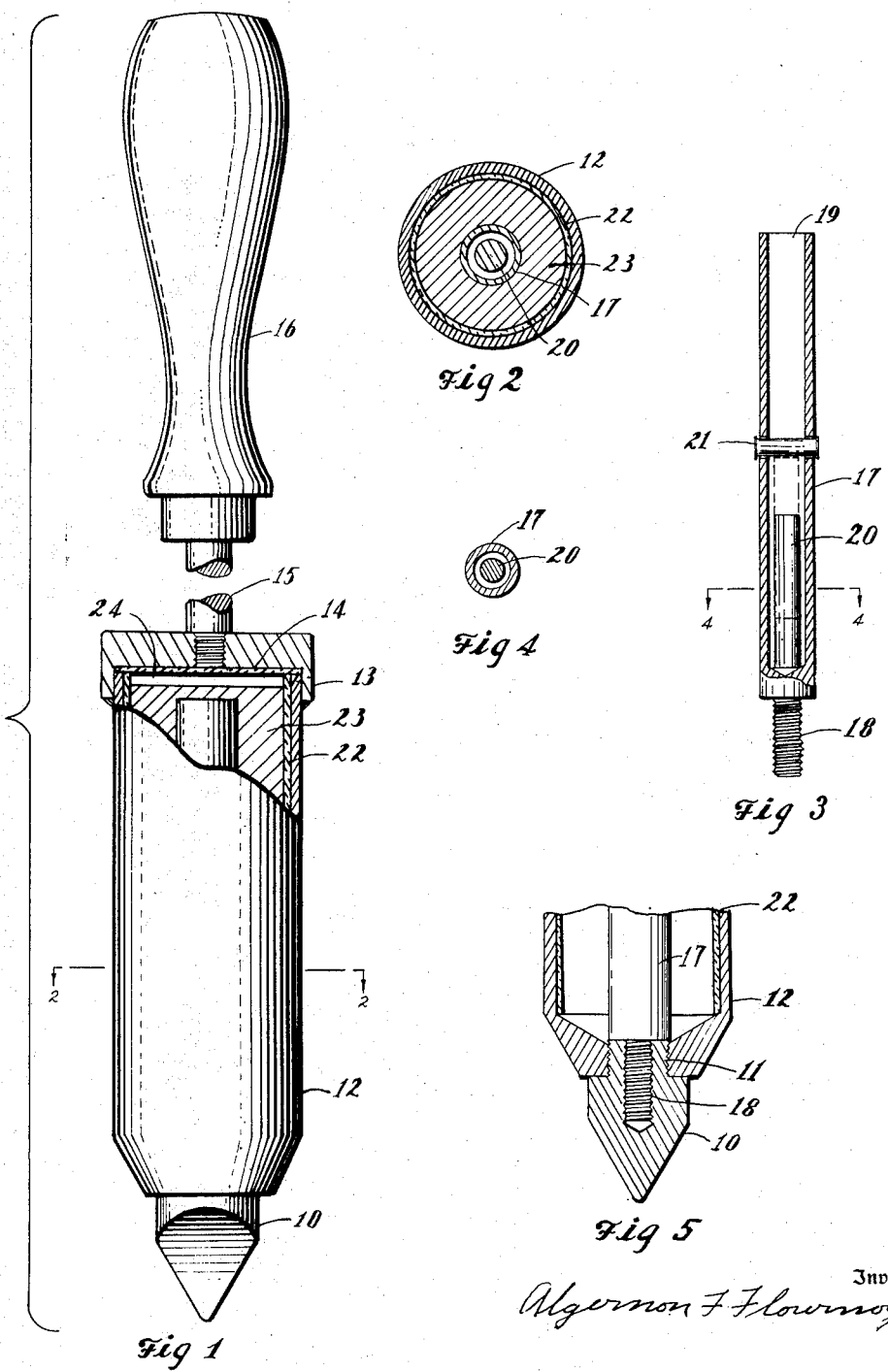
Inventor
Algernon F Flournoy Patented Dec. 19, 1950

2,534,257

UNITED STATES PATENT OFFICE 2,534,257

SOLDERING IRON

Algernon F. Flournoy, Shreveport, La., assignor, by decree of distribution, to Margaret Thurston Flournoy Application January 23, 1947, Serial No. 723,740

4 Claims. (Cl. 113—105)

My invention relates to soldering irons in general but more particularly to the type of soldering iron that is adapted to be heated over a flame or the like.

Various shapes and sizes of soldering irons are clearly set forth in the teaching of the prior art. Other inventors have sought to provide soldering irons that would dissipate their useful heat at substantially constant temperatures. The other inventors of soldering irons have tried to accomplish this desired end by varying the shape and size of the iron and by the use of various metals employed in the making of the soldering iron. Various materials have been used in the making of soldering irons and it was generally thought, up to the time of this invention, that a solid copper rod or bar was the best material available for any soldering iron that required heating over a flame, due to its fairly good heat conductivity, high specific heat and relative cheapness.

Many difficulties, however, have arisen in the use of any type or size of the flame-heated iron; difficulties which have been greatly lessened or entirely overcome in this invention.

One of the chief of these difficulties has been in the heating of the iron. While it is true that the variation in temperature between the iron and the melting point of the solder being used, can be substantially great, it is well known that an iron can be heated to such a high temperature that it cannot be used at all; but must be allowed to cool to a temperature which in the judgment of the operator, is sufficient to perform good work. In the common flame-heated iron there is no way of knowing when that proper temperature has been reached except through the skill of long practice or except by constantly testing the iron. If the iron is not hot enough it will not melt the solder at all. Thus, again, requiring more heat and testing until a working temperature has been reached.

Another difficulty in using the prior art flame-heated irons is the extreme shortness of time that the iron may be used to any advantage. The rapid and constant rate at which the ordinary copper iron cools will, in reality, remain only for an extremely short period of time at a fixed or desired range of temperature. Hence the iron must be used hastily to perform the maximum amount of work between the highest and lowest working temperatures, according to the solder being used. In an effort to overcome this difficulty many operators employ two irons—one being heated while the other is used.

Since the recent marketing of new alloys and solders of various low melting temperatures, it is difficult, even for the skilled operator, to judge the best working temperature for his soldering iron; and almost impossible for the unskilled mechanic or an apprentice to perform a soldering operation with any degree of accuracy or without the loss of considerable time.

It is an object, therefore, of my invention, to provide a soldering iron adapted to be heated over a flame or the like for use in a soldering operation.

It is another object of this invention to provide a soldering iron that if overheated will drop quickly to the proper working temperature for a soldering operation when removed from the flame or other source of heat.

A further object of this invention is to provide a soldering iron in which the actual working temperature of the iron is maintained at a substantially even rate for at least twice the length of time of the prior art solid-type copper iron of equal weight.

Another object of my invention is to provide a soldering iron in which the working temperature of the iron may be varied according to the type of work being done or according to the melting point of the solder being used.

Another object of my invention is to provide a soldering iron in which nearly all of the total latent heat of the iron is stored in an insulated chamber from which the heat is conducted to the point of the iron for useful work to be done by the point of the iron.

Other objects and advantages of my invention will appear in the following detailed description and appended claims when viewed together with the accompanying drawings.

My invention consists generally in a soldering iron having an enclosed, metal chamber which replaces the common solid copper rod now in use. This chamber is preferably lined with an insulating material and filled with an element or alloy having a high heat of fusion value and a melting point above the melting points of the commercial solders to be used.

A conductor is projected from the point of the iron into the mass of fusible alloy to conduct the heat to the point of the iron when it is in use. In the soldering iron heat at a high temperature for melting any of the commercial lead and tin alloy solders can be maintained for a considerable period of time due to the phenomena of the heat of fusion of the alloy stored in the insulated chamber of the iron, which heat of fusion is dissipated at a substantially constant temperature while the entire mass of molten material freezes.

In the drawings,

Figure 1 is a partially broken elevational view of a soldering iron embodying my invention.

Figure 2 is a cross-sectional view taken along lines 2—2 of Figure 1.

Figure 3 is a partially broken elevational view of the conductor element of my invention.

Figure 4 is a cross-sectional view taken along lines 4—4 of Figure 3 and,

Figure 5 is a broken cross-sectional view of the nose portion of my invention.

Referring now to the drawing, numeral 10 designates the tip or nose of the soldering iron of a type that is used in most soldering irons. The upper end of the nose 10 is provided with an extending stud portion 11 having external threads adapted to be screwed into the internally threaded body portion 12. The joint thus made between the nose 10 and the body 12 is preferably made leak proof by using some heat resisting cement applied to the engaging threads or the joint may be sealed around the peripheral joining line of the member by silver solder or by a weld.

The body 12 consists in a hollow tube-like structure, having its lower end attached to the nose 10 as formerly described and a cap 13 on its upper end. The cap, in this instance, has a shallow counterbore 14 into which the body 12 is snugly fitted. The peripheral joining line of the member should be sealed in any of the manners employed in sealing the nose 10 to the body 12. If desired, the cap 13 may be merely threadedly engaged with the body 12 to facilitate a replacement of the fusible substance contained in the hollow body 12.

Extending from the cap 13 I have provided a rod 15 which, in this instance, threadedly engages the cap 13 in an axial alignment. It can be seen here also that any other means of attaching the rod 15 may be used. On the upper end of the rod 15 I have attached a suitable handle 16, preferably made of wood material.

The novelty of my invention is found in the internal construction and arrangement of the body 12 of the iron and elements in the same which I shall now describe.

Extending upwardly from the nose 10 of the iron and into the hollow body 12 I have provided a metallic conductor 17, which is provided with a threaded stud 18 firmly engaged in internal threads provided in the threaded stud portion 11 of the nose 10. While a solid conductor might be used, it is preferable to use one of the type as shown in Figure 3 of the drawing. This figure shows a conductor 17 having a threaded stud portion 18 on its lower end which is adapted to threadedly engage the nose 10 of the iron. The conductor consists of a metallic rod having a deep counterbore 19 extending almost its entire length. The conductor 17 is made slightly less in length than the distance between the upper portion of the nose 10 and the under side of the upper cap 13 of the iron. The conductor 17 is made of a material having a high heat conductivity factor such as aluminum or copper. Into the counterbore 19 is placed a short length of a metallic rod 20 of a lesser diameter than the diameter of the counterbore 19. The rod 20 is prevented from coming out of the counterbored recess 19 by a pin 21 which extends transversely through the lateral side walls of the conductor 17 and swedged on each of its ends. The purpose of this form of construction in my conductor will be made apparent in the explanation of the operation of the iron to follow.

It will be noted now that the inner lateral walls of the body 12 of the iron together with the under side of the cap 13 are lined with an insulating material 22. This insulation is preferably installed in the iron with the use of a heat resisting cement or glue, such as water-glass.

It will also be noted that the inner space in the hollow body 12 has been substantially filled with an element or other substance 23 leaving only a small space 24 for expansion of the substance at the upper end of the hollow body 12, shown in Figure 1 of the drawings.

The preparation of my soldering iron for a typical soldering operation might be as follows. The body 12 of the iron is placed in a flame or source of heat. As the iron becomes hot heat is conducted to the enclosed mass of element, alloy, or other substance 23, through the nose 10 and conductor element 17. In practice, I have found that an alloy having a freezing temperature of approximately 100 degrees higher than the melting point of the solder being used produced good results. My further description will for purpose of explanation refer to the use of an alloy substance, it being understood that other substances might be used instead.

An indication that the alloy is in the molten state may be had by simply shaking the iron. If the mass of alloy is in the molten state the rod 20 in the counterbore of the conductor 17 will move back and forth as shown by the dotted lines in Figure 3 and will give out a decided clicking sound as it strikes the pin 21 on one end and the bottom of the counterbore on the other end.

When this test is made and it is certain that the alloy is in the molten state, then the iron is removed from the heating source and is ready for use. Any excess or overheating that might occur after the alloy has melted will be stored in the alloy 23, outer shell 12, and nose 10, as simple latent heat, which heat will be quickly dissipated upon removal of the iron from the heating source, thus lowering the temperature of the iron down to the freezing point of the enclosed alloy, and a working temperature for melting solder.

An actual test was made with a solder made according to this specification using pure cadmium metal (melting point 610° F.) as the fusible substance 23 in the body 12 of the iron.

The solder that was used was a composition of lead and tin, having a melting point of approximately 525° F. The iron was heated over a flame until it was certain that the cadmium was in a complete molten state; and the time was then noted and recorded and the testing stick of the above composition solder was then applied and found to be suitable for actual work for a period of eighteen minutes. The shell 12 held approximately two pounds of cadmium. The whole iron did not weigh more than two and one-half pounds.

A second solid iron was then tested, having substantially the same weight as the above described soldering iron. The second iron was heated to 610° F., at which time it was removed from the flame and tested under the same conditions as the other iron. This solid copper iron was found to be useful for melting the same stick of test solder for only approximately ten minutes.

This remarkable result is achieved by insulating and controlling the dissipation of the latent heat of fusion given off by the freezing of the alloy in the body of the iron. Cadmium is calculated to give up approximately seven (7.0) B. t. u.'s per cubic inch in heat of fusion. Thus it can be seen that any element or alloy might be used in the insulated body of the iron which might have a higher or lower heat of fusion that may be easily matched with most any melting points of solders. Actual tests have also proven that the length and size of the conductor, as well as its composition, will greatly affect the amount of heat and the time it takes for the heat to flow from the freezing molten mass of the substance in the hollow body 12 into the working tip 10 of the soldering iron.

My invention in a soldering iron will prove highly advantageous to plumbers, linemen, sheet metal workers or in any trade where an electrically heated iron is inconvenient or unavailable. Due to the greater efficiency and relative inexpensiveness of an iron made according to the teaching of my invention, workmen might be able to own a number of irons, each having a different alloy in its body chamber with a different melting point and heat of fusion values. By using a soldering iron made under the teachings of this specification a workman can put in more actual working time on a job than he could formerly, using prior art solid type soldering irons of the kind adapted to be heated directly over a flame. He would be assured of an even flow of heat from his iron at a substantially constant temperature. He would also be assured that his iron would not overheat to such an extent that he would waste valuable time waiting for it to cool to the working temperature, remembering that this iron will cool down to working temperature more rapidly than will a solid copper iron of prior art construction.

While I have described my invention in detail as might be used in a soldering iron, it is to be understood that various changes and variations may be made in the actual design and construction without departing from the spirit and scope of my invention as defined by the following claims. That is to say, other useful heating tools may be made under these teachings and within the scope of the following claims.

I claim:

1. A soldering iron adapted to be heated over a flame or the like comprising a hollow body portion defining an enclosed chamber, substantially filled with a mass of fusible substance having a high latent heat of fusion value; a heating element attached to one end of said hollow body portion and a handle attached to the other end of said hollow body portion, said heating element including a nose extending outwardly from said hollow body and a metallic heat conductor extending into said hollow body through said fusible substance substantially the full length of and lying on the longitudinal axis of said hollow body portion.

2. A device as claimed in claim 1, wherein said chamber is filled with a fusible substance consisting in pure cadmium metal having a melting point of 610° F.

3. A soldering iron adapted to be heated over a flame or the like, comprising an elongated hollow body portion defining an enclosed chamber having its inner wall surface lined with an insulating material; said chamber being substantially filled with a mass of fusible substance having a high latent heat of fusion value; a nose piece attached to one end of said chamber and a handle attached to the other end thereof; said insulated chamber being adapted to retard the dissipation of the latent heat of fusion of said alloy or other substance during its period of freezing; and a heat conductor in said chamber for directing the heat dissipated by said alloy to said nose piece, said heat conductor extending through said mass of substance along and substantially the full length of the longitudinal axis of said hollow body portion.

4. A soldering iron adapted to be heated over a flame, comprising an insulated hollow body portion open at one end to permit said hollow body portion to be substantially filled with a mass of fusible substance of high latent heat of fusion; a nose piece attached to one end of said hollow body portion, a handle attached to the other end thereof; a heat conductor attached to one end of said nose piece and having a portion of its length extending into said mass of fusible substance; said heat conductor being provided with a recess; and a metal slug slidably mounted in the recess of said heat conductor, said slug being formed from metal having a higher melting point than that of the fusible substance.

ALGERNON F. FLOURNOY.

REFERENCES CITED

The following references are of record in the file of this patent:

UNITED STATES PATENTS

| Number | Name | Date |
|---|---|---|
| 1,181,700 | Troy | May 2, 1916 |
| 1,512,456 | Carman | Oct. 21, 1924 |
| 1,520,597 | Reavis | Dec. 23, 1924 |
| 1,602,266 | Jarkovsky | Oct. 5, 1926 |